April 14, 1970 R. O. WINDER 3,506,845
NETWORKS OF ELEMENTS FOR IMPLEMENTING THRESHOLD FUNCTIONS
Filed May 5, 1966 6 Sheets-Sheet 1
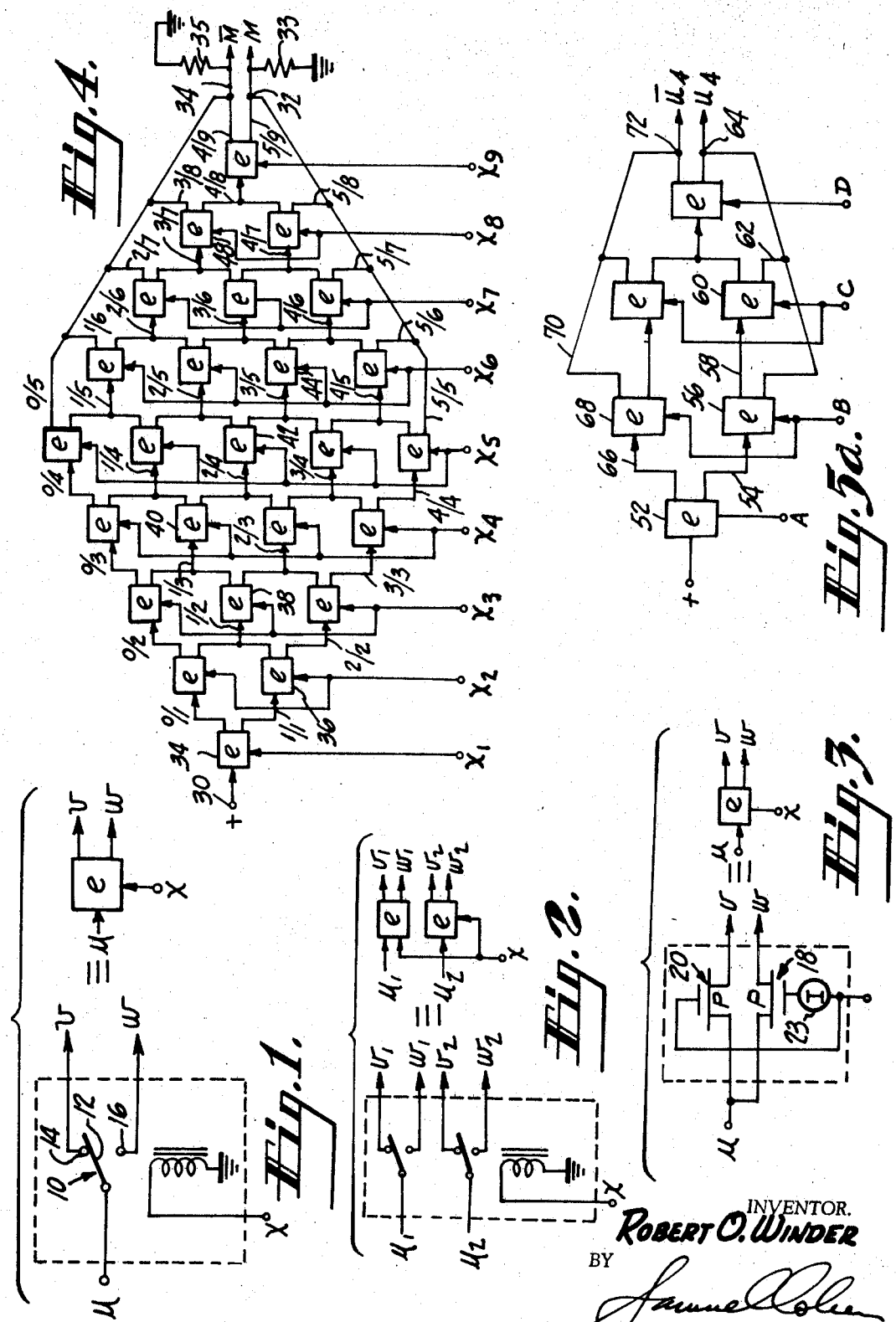
INVENTOR.
Robert O. Winder
BY
Attorney April 14, 1970 R. O. WINDER 3,506,845
NETWORKS OF ELEMENTS FOR IMPLEMENTING THRESHOLD FUNCTIONS
Filed May 5, 1966 6 Sheets-Sheet 2

INVENTOR.
ROBERT O. WINDER
BY
Attorney

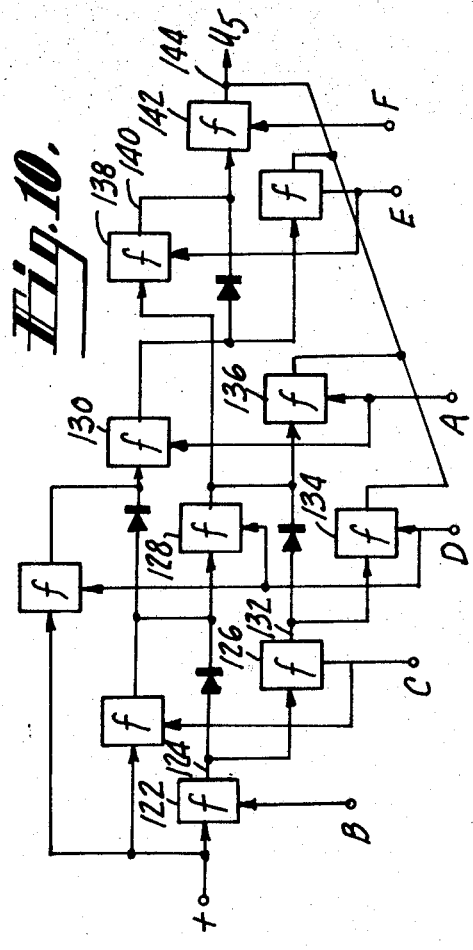
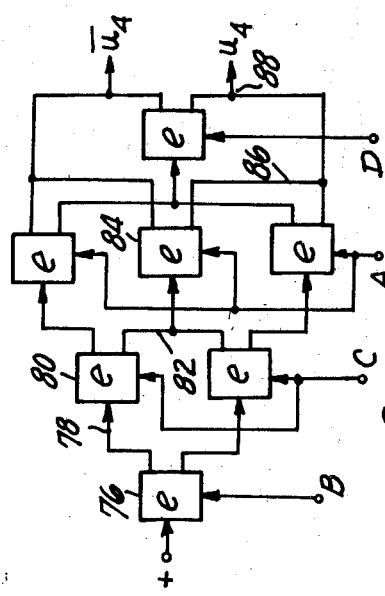
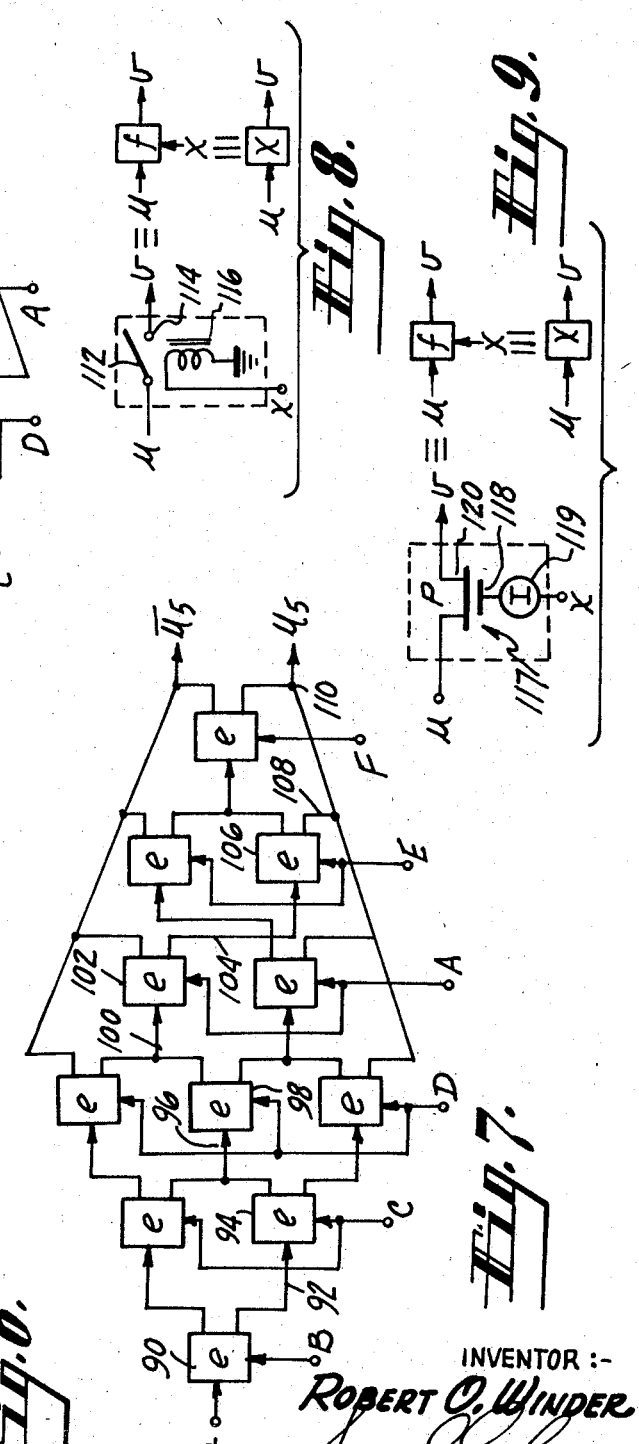
INVENTOR:-
ROBERT O. WINDER
BY
Attorney

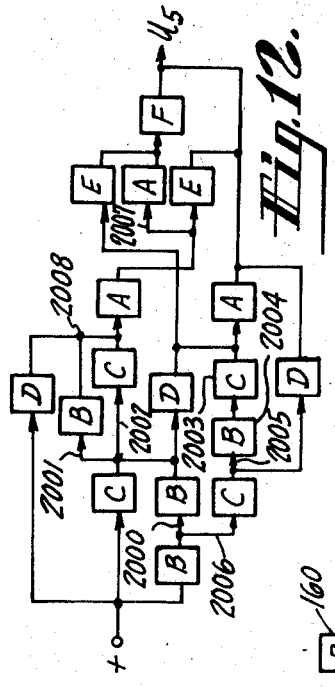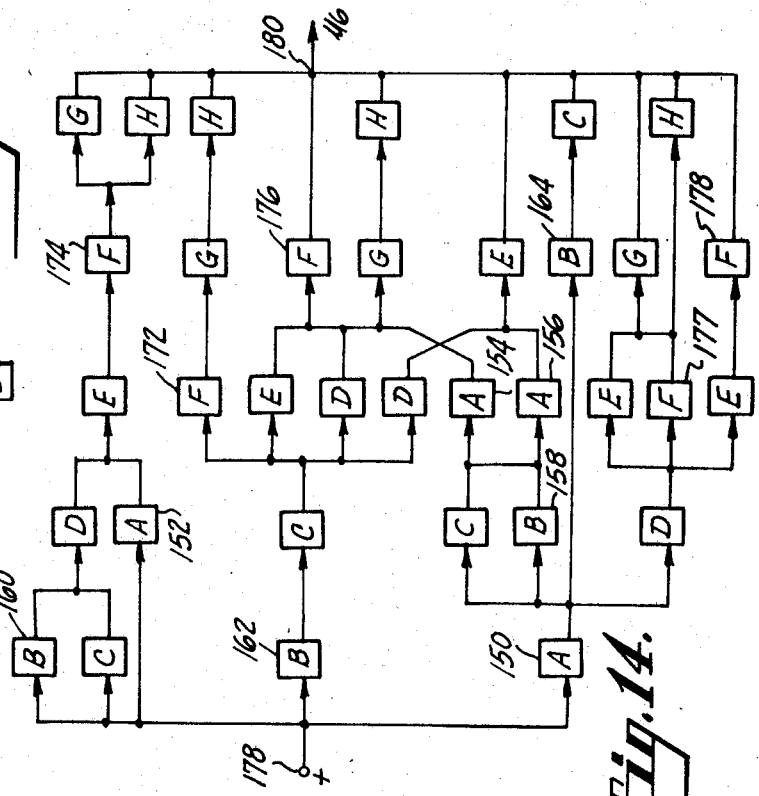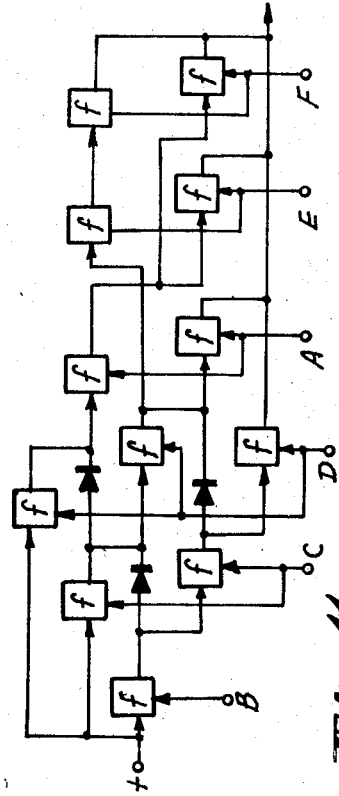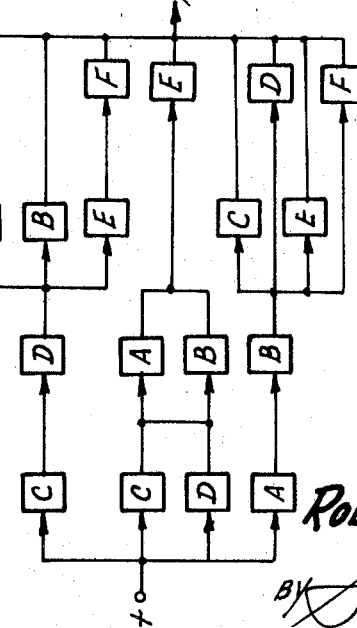

April 14, 1970  R. O. WINDER  3,506,845
NETWORKS OF ELEMENTS FOR IMPLEMENTING THRESHOLD FUNCTIONS
Filed May 5, 1966  6 Sheets-Sheet 5
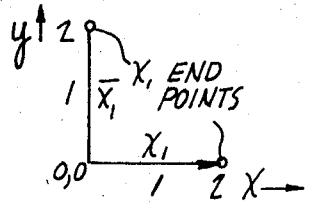
*Fig. 15a.*
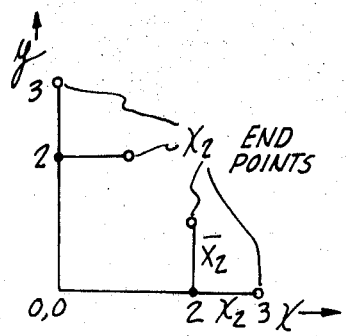
*Fig. 15b.*
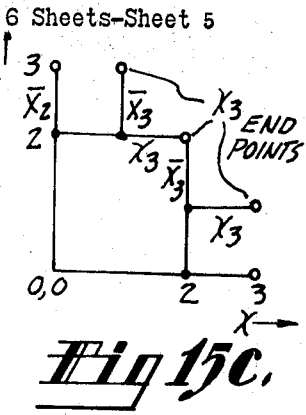
*Fig. 15c.*
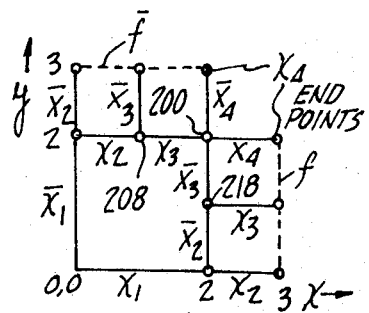
*Fig. 15d.*
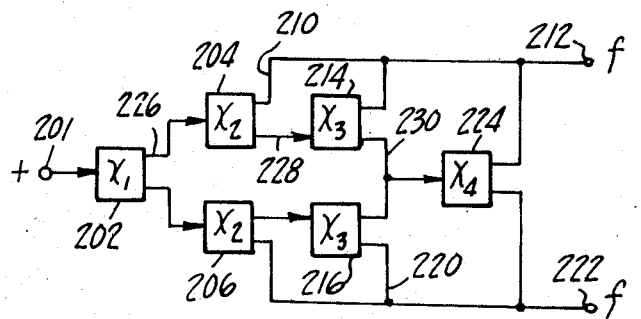
*Fig. 16a.*
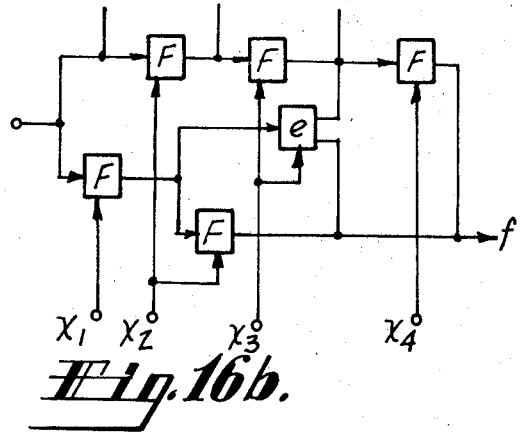
*Fig. 16b.*
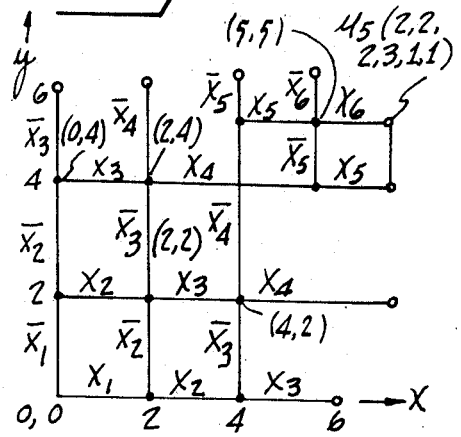
*Fig. 17.*
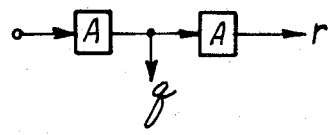
*Fig. 18a.*
*Fig. 18b.*
INVENTOR.
ROBERT O. WINDER
BY
Attorney April 14, 1970 R. O. WINDER 3,506,845
NETWORKS OF ELEMENTS FOR IMPLEMENTING THRESHOLD FUNCTIONS
Filed May 5, 1966 6 Sheets-Sheet 6

INVENTOR.
Robert O. Winder
BY
James Cole
Attorney 3,506,845
NETWORKS OF ELEMENTS FOR IMPLEMENTING
THRESHOLD FUNCTIONS
Robert O. Winder, Trenton, N.J., assignor to Radio Corporation of America, a corporation of Delaware
Filed May 5, 1966, Ser. No. 547,873
Int. Cl. H03k 19/08
U.S. Cl. 307—205                                12 Claims

ABSTRACT OF THE DISCLOSURE

Networks of two condition elements, each including at least one normally open switch. Each switch is controlled by a stimulus indicative of a single argument of a threshold function. The networks are designed to realize threshold functions such as majority functions, N-universal functions and so on. The networks may be implemented with field-effect transistors, relay contacts or other simple structures.

---

This invention relates to logic circuits for data processing systems.

Threshold gates are in common use as building blocks for data processing system. As explained in Patent No. 3,162,774, issued Dec. 22, 1964, to the present inventor, threshold gates are relatively easy to design and may be implemented in many ways, provided the number of inputs (the "fan-in") to each gate is relatively low. For example, a maximum fan-in of 5, which implies a difference of 20% between the closest of two different input conditions, is an engineering requirement which can be satisfied by many practical gates. However, fan-ins substantially larger than this often cannot be achieved reliably, by conventional means, at the present state of the art.

The fan-in constraint above places a severe restriction on the logical designer. He is forced to design a logic network in terms of gates which have a limited number of inputs even though gates or networks with a much larger number of inputs, if available, might provide a much better system.

The systems described in the patent cited offer an important solution to the problem. The building blocks discussed, rather than consisting of a single element, (such as a single transistor and its associated resistor and the like) comprise networks of threshold gates, such as majority gates. Each majority gate has a limited number of inputs, such as three, and the gates are arranged in regular arrays. Each gate receives input signals indicative of information bits and some of the gates, in addition, receive fixed control inputs indicative of the binary digits 1 or 0. The gates are interconnected to implement any desired threshold function "$t$ out of $n$," where $n$ is the number of inputs and $t$ is not greater than $n$, and where $n$ (and $t$) may be arbitrarily large. Such a function may be defined as one which has the value 1 when any $t$ or more of the arguments have the value 1 and which has the value 0 when less than $t$ of the arguments have the value 1.

The present invention is directed to the same problem as above, however, the elements employed in the building blocks are not threshold gates. The building blocks of the present invention, like the circuits of the patent above, comprise arrays of elements (sometimes regular arrays and sometimes not) but each element of the array including means for simulating a single-pole, double-throw switch or a single-pole, single-throw switch. An information signal representing the binary digit 1, applied to a switch, places the switch in one state, and an information signal representing the binary digit 0 places the switch in its other state.

The switch elements employed, in practice, may be relay contacts or cryoelectric switch elements such as cryotrons, or field effect transistor switches such as MOS (metal oxide semiconductor) or TFT (thin film) transistors, or conventional bipolar transistor switches.

Some important advantages of the present building blocks are first, that they may require relatively small amounts of power. Second, they permit the use of elements within the building block which are sensitive to a single stimulus—a single information signal representing a binary digit—but are not especially suitable for summing input signals or for discriminating against signals whose amplitudes differ by small amounts. One practical circuit element of this type, which with today's advances in integrated circuit technology is becoming more and more important, is the MOS transistor.

The invention is discussed in greater detail below and is shown in the following drawings of which:

FIGURE 1 is a diagram of an elementary element in the building block of one form of the present invention;

FIGURE 2 is a diagram of two elementary elements controlled by the same information signal in a network according to one embodiment of the invention;

FIGURE 3 is a diagram of a transistor circuit which is the equivalent of the circuit of FIGURE 1;

FIGURE 4 is a block circuit diagram, 9-input majority-minority gate according to the invention;

FIGURES 5a and 5b are block circuit diagrams of a network according to the invention for implementing the 4-universal threshold function;

FIGURE 6 is a block circuit diagram of a modified form of the circuit of FIGURE 5;

FIGURE 7 is a block circuit diagram of a building block according to the invention for implementing the 5-universal threshold function;

FIGURES 8 and 9 are diagrams of elementary elementary elements used in the building blocks of FIGURES 10–14;

FIGURE 10 is a block circuit diagram of a building block for implementing a 5-universal threshold function;

FIGURES 11 and 12 are modified forms of the circuit of FIGURE 10;

FIGURE 13 is a block circuit diagram of a building block for implementing a different 5-universal threshold function;

FIGURE 14 is a block circuit diagram of a building block for implementing a 6-universal threshold function;

FIGURES 15a–15d show successive steps in a geometrical construction which may be employed to design the circuits of the present invention;

FIGURE 16a is a block circuit diagram of the circuit represented in FIGURE 15d, implemented with "$e$" type elementary elements;

FIGURE 16b is a block circuit diagram of a modified form of the circuit of FIGURE 16a, implemented with five "$f$" type elementary elements and one "$e$" type element;

FIGURE 17 is a graphical construction for another circuit according to the invention;

FIGURES 18a and 18b show circuit modifications which are possible in the networks of the invention;

FIGURE 19 is a diagram of a network, designed by conventional methods, for realizing a five-argument majority function;

Figures 5B, 19:
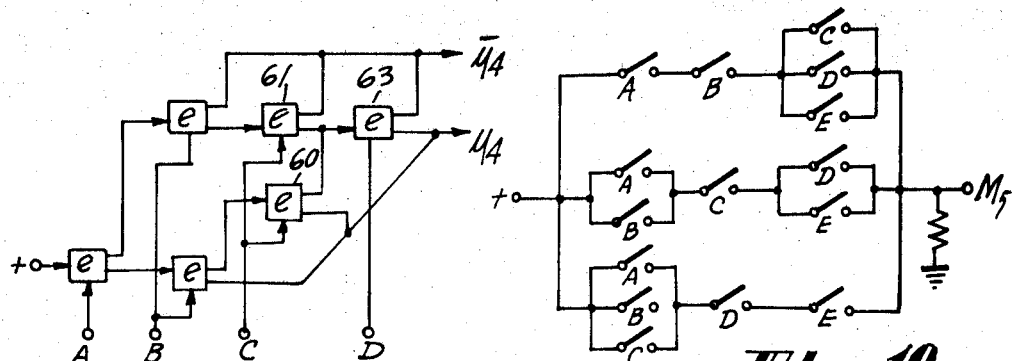

The circuits discussed in this application receive electrical signals representing binary digits and produce output signals representing binary digits. For the sake of brevity, the input and output signals are sometimes referred to as bits having the value 1 or 0, as the case may be. While either level of signal may represent the bit 1, it is assumed arbitrarily, for the purpose of the present discussion, that a relatively high level signal represents a 1 and a relatively low level signal, such as one at ground potential, a 0.

FIGURE 1 shows an elementary element used in the building blocks of FIGURES 4–7. The element consists of a single-pole, double-throw switch 10 which is actually the contacts of a relay. When $x$, the input signal to the relay coil 12, represents a 0, no current flows through the coil and the arm 12 engages terminal 14. In practice, this arm is normally biased in this position by means of a spring or the like. When $x$ represents the binary digit 1, the relay is actuated and the arm 12 makes contact with the terminal 16.

As will be shown in the networks discussed below, the terminal marked $u$ may be connected to a current source and in this case when the relay is in the condition shown, current can flow from $u$ to $v$. When $x$ is a 1, the relay is actuated and current can flow from $u$ to $w$. In FIGURES 4–7, the circuit at the left of FIGURE 1 is illustrated by a block with an $e$ (for "elementary") within the block, as shown at the right of FIGURE 1.

In a number of the networks of the invention, a single input signal $x$ controls the operation of a number of switches, that is, a number of relay contacts. The actual circuit may be the one shown at the left of FIGURE 2 and this circuit is illustrated schematically as shown at the right of FIGURE 2. The operation of the circuit of FIGURE 2 should be self-evident from the explanation given in connection with FIGURE 1. The switch arms are normally biased to the position shown so that current available at $u_1$ flows to $v_1$ and current available at $u_2$ flows to $v_2$. When $x$ is 1, actuating the switch, current flows from $u_1$ to $w_1$ and from $u_2$ to $w_2$.

As an alternative to the circuits of FIGURES 1 and 2, each elementary element in the networks of FIGURES 4–7 may consist of a pair of transistors as shown in FIGURE 3, these elements acting in exactly the same way as the electromechanical devices of FIGURES 1 and 2. The transistors 18 and 20 may be P-type MOS transistors of the enhancement type. The input terminal legended $u$ connects to the source electrodes of both transistors 20 and 18 and may be at a positive voltage. The terminals $v$ and $w$, connected to the drain electrodes of transistors 20 and 18, respectively, may be connected through respective loads (not shown) to ground. The signal input terminal 21 is connected directly to the gate electrode of transistor 20 and through an inverter 23 to the gate electrode of transistor 18. (Note that if $x$ and $\bar{x}$ are both available, the inverter is not needed.)

If $u$ is at positve potential, and if $x$ is initially at 0 (at ground potential), the gate electrode of transistor 18 is at the same potential as its source and the gate electrode of transistor 20 is at a more negative potential than its source electrode. Under this set of conditions, the drain-to-source path of transistor 20 exhibits a low impedance and the drain-to-source path of transistor 18 exhibits a high impedance.

When $x$ becomes 1 (when the voltage assumes a positive value such as that of the terminal $u$) the circuit conditions change. Now, the source-to-drain path of transistor 20 exhibits a high impedance and the source-to-drain path of transistor 18 exhibits a low impedance.

While not shown explicitly in FIGURE 3, it is also to be understood that there are other switch realizations which may be employed to make up the block 3. One example is a pair of cryotron switches which, in one condition, permit current flow through one path and in another through a second path. Another is other types of transistor pairs.

Networks made of switch elements which are actuated by a single stimulus are, per se, well known. Such networks can be designed by conventional methods, that is, by formulating a Boolean expression which describes the function and by substituting switch elements for the respective terms of the expression. For example, the expression for the 5-argument majority function:

$$M_5(A,B,C,D,E) = ABC + ABD + ABE + ACD + ACE + ADE + BCD + BCE + BDE + CDE$$

can be factored to obtain:

$$M_5 = AB(C+D+E) + (A+B)C(D+E) + (A+B+C)DE$$

and can be realized by a group of normally-open, single-pole, single-throw switches arranged in series and parallel as shown in FIGURE 19. In this figure, the letter next to the switch means that the switch is closed when the argument represented by that letter has the value 1. However, cleverness, luck, and patience are required to develop the best possible factoring of a given function, and it usually is not feasible to determine whether any circuit designed in this way is in fact optimal, that is, uses the fewest circuit elements.

Furthermore, the best realizations cannot always be arrived at by factorization. One reason for this is that only series-and-parallel networks may be obtained in this way and it is known both from theoretical and experimental work that such networks are not always optimal. Another reason is that "mixed" networks, containing elements other than "normally open" or "normally closed" relay contacts, cannot be handled in this way.

The networks of this invention are not described by factorizations of Boolean expressions, but rather by certain geometric constructions. Since the rules for the construction, in the abstract, are difficult to follow, a number of specific examples, designed with the aid of these rules, are given first and the general rules later.

The first example is based on FIGURE 3 of the Winder patent cited above. This figure illustrates a 5 out of 9 majority gate employing as elementary elements in the network, 3-input majority gates.

FIGURE 4 of the present application shows a network designed to implement the same function and, in addition, to produce an output indicative of the minority function. As contrasted to the circuit of FIGURE 19, which is designed by following conventional rules of logical design, the network of FIGURE 4 is not a simple series-parallel network.

The network of FIGURE 4 includes twenty-five elementary elements $e$. A current source, indicated by "+," is connected to the input terminal 30. The output terminal 32 is connected through a load, such as resistor 33, to ground and the output terminal 34 is also connected through a load such as resistor 35 to ground. The output terminals of the networks of the other figures are similarly connected, however, to simplify the drawing, the loads are not shown in these other figures.

The fractional designations $q/r$ adjacent to the various leads in FIGURE 4 indicate that exactly $q$ out of $r$ of the inputs to that point represent a 1. For example, the designation 2/2 ($q=2$, $r=2$) means that both of the inputs up to that point, namely $x_1$ and $x_2$, represent 1's. The designation 2/4 means that exactly 2 of the 4 inputs $x_1 \ldots x_4$ are 1.

The operation of the circuit of FIGURE 4 may be explained by means of a specific example. Assume that only three of the nine inputs are 1 and assume that these three inputs are $x_1$, $x_4$ and $x_5$. $x_1=1$ causes element 34 to produce an output at the lead legended 1/1. $x_2=0$ causes element 36 to produce an output at 1/2. $x_3=0$ causes element 38 to produce an output at 1/3. $x_4=1$ causes element 40 to produce an output at 2/4. $x_5=1$ causes element 42 to produce an output at 3/5. $x_6=0$ causes element 44 to produce an output at 3/6. $x_7=0$ causes element 46 to produce an output at 3/7. $x_8=0$ causes element 48 to produce an output at 3/8. This output goes directly to output terminal 34 so that $\overline{M}=1$ and $M=0$. As only three of nine inputs are 1, $\overline{M}=1$, $M=0$ is the correct result.

More generally, the network can be seen to operate on the following principle: At any given column of elements, exactly one element has an input of 1, and the position of that element reflects the number of variables up to that point which have had value 1. This positionally encoded representation of the partial sum of input 1's replaces the conventional idea of directly summing input signals. The connecting together of the appropriate signal heads along two boundaries replaces the conventional idea of comparing the input sum against a threshold.

It should be clear from the example above and from the principles given above how any majority-minority function can be realized by switch elements, each of which is controlled by only a single information signal.

Before discussing the remaining circuits, it is necessary to digress a moment to the subject matter of a second patent application filed by the present inventor concurrently herewith. It is titled "Data Processing" and assigned the identification Ser. No. 547,943. This application deals with basic building blocks for computers and includes a discussion of a new class of symmetric switching functions discovered by the present applicant, given the name "N-universal" threshold functions.

The 4-universal, 4-argument threshold function is defined by the single Boolean equation:

$$U_4(A,B,C,D)=A(B+C+D)+BCD$$
$$U_4(A,B,C,D)=A(B+C+D)+BCD \quad (1)$$

A 5-universal, 6-argument threshold function is defined by the Boolean equation:

$$U_5(A,B,C,D,E,F)$$
$$=A(BC+BD+CD)+(B+C+D)(E+F)$$
$$+BCD+(BC+BD+CD)EF \quad (2)$$

There are exactly two other 6-argument functions which are 5-universal.

There are also an eight-argument, 6 universal function and a 10-argument, 7-universal function. Their equations are involved and need not be discussed here.

The concurrently filed application also discusses how the universal functions may be implemented. For example, the application shows that the 4-argument, 4-universal function may be implemented by a 5-input majority gate, two of whose input terminals are permanently tied together. It also discloses that the 6-argument, 5-universal threshold function may be implemented by any one of three different ways. One implementation, for example, is an eleven-input majority gate, the input terminals of which are tied together in such way that there are only six inputs assigned respective weights 3,2,2,2,1,1. It also discloses that the 8-argument, 6-universal threshold function may be implemented by a nineteen-input majority gate with input terminals tied together in such way as to simulate an eight-input gate assigned weights 5,3,3,2,2,2,1,1 and having a threshold of 10.

According to the present invention, the universal threshold functions may be implemented by the use of the elementary elements such as shown in FIGURES 1–3. An important advantage of this way of making these building blocks is that tolerance problems are essentially eliminated, even for the most complex building blocks. For example, the $U_6$ threshold function, when implemented in the way discussed in the copending application, employs a threshold gate having a total number of input weights of 19. Since some of the inputs are only assigned the weight 1, the circuit must be capable of discriminating between, for example, a case in which 10 of the 19 weights represent a 1 and a case in which 9 of the 19 weights represent a 1. In the networks of the present invention, each element only has to determine whether its input is a 1 or a 0, regardless of how complex the function to be realized.

The circuit of FIGURE 5a implements the 4-argument, 4-universal function. The circuit comprises six elementary elements interconnected as shown. The arrangement is such that the input A has twice as much effect on the operation of the networks as any one of the inputs B, C or D. In other words, within the building block, the inputs A, B, C, D have effective weights 2, 1, 1, 1, respectively. The circuit operates as an asymmetric threshold gate and realizes precisely the same logic function as the circuit in FIGURE 3 of the concurrently filed application.

The operation of the circuit of FIGURE 5a readily may be understood by a number of specific examples. Assume first that A and C are 1 and B and D are 0. The bit $A=1$ causes element 52 to produce an output at lead 54. The bit $B=0$ causes element 56 to produce an output at lead 58. The bit $C=1$ causes element 60 to produce an output at lead 62 and this output is applied directly to the output terminal 64. Accordingly, it can be said that when A and C both equal 1, $U_4=1$ and $\overline{U}_4=0$. An inspection of the Boolean Equation 1 indicates that this result is correct.

Assume now for a second example that A and B equal 0 and C and D equal 1. The bit $A=0$ causes element 52 to produce an output at lead 66. The bit $B=0$ causes element 68 to produce an output at lead 70 and this output is applied directly to output terminal 72. The result obtained therefore is $U_4=0$ and $\overline{U}_4=1$ and Boolean Equation 1 indicates that this result is correct.

More generally, the network can be understood in terms of positional notation by redrawing it as in FIGURE 5b. It can be seen that if the input $A=1$, the current flowing through the network is translated upwards by two rows, while any one of the inputs $B=1$, $C=1$ or $D=1$ only effects a translation of current flow through one row; this reflects the fact that the input A has weight 2 compared to weights 1 for inputs B, C and D. It may also be observed that the upper output lead of element 60 and the lower output lead of the immediately adjacent element 61 in the same column, are connected together and served as a common input lead to element 63. This confluence of leads is typical of the networks of this invention.

The implementation of FIGURE 5a is relatively economical as it employs only six elementay elements. However, it should be understood that alternative forms of the network are possible. It is not necessary that the elements responding to the successive input bits be placed in any particular order.

An illustration of the property above is given in FIGURE 6. This is a redesign of the network of FIGURE 5 with the elements responding to bit A placed in the third column of the network rather than the first column. This design requires 7 elementary elements rather than the 6 of FIGURE 5. However, the function performed is precisely the same. To give one example, the same one as the first given in connection with FIGURE 5, assume that A and C are both 1 and B and D are both 0. The bit $B=0$ applied to element 76 causes an output to appear on lead 78. The bit $C=1$ applied to element 80 causes an output to appear on lead 82. The bit $A=1$ applied to element 84 causes an output to appear on lead 86 and this output is applied directly to output terminal 88. Accordingly, under this set of input conditions, $U_4=1$ and $\overline{U}_4=0$.

FIGURE 7 illustrates a circuit for implementing the 5-universal logic function. There are 11 elementary elements in the network, arranged as shown. Again, to demonstrate the operation of the circuit, a specific example is given. Assume that A, B and $E=1$ and C, D and F are each equal to 0. The bit $B=1$ applied to element 90 causes an output to appear at least 92. The bit $C=0$ applied to element 94 causes an output to appear at lead 96. The bit $D=0$ applied to element 98 causes an output to appear at lead 100. The bit $A=1$ applied to element 102 causes an output to appear on lead 104. The bit $E=1$ applied to element 106 causes an output to appear on lead 108 and this output goes directly to output terminal 110. Thus, $U_5=1$ and $\overline{U}_5=0$, just as indicated by Boolean Equation 2.

While a number of specific examples are given above of the networks of the present invention, as already mentioned, the principles set forth are of general applicability and can be employed to realize a wide variety of threshold functions. The geometric construction described below permits the designer to implement any such function. This construction occurs in the positive quadrant of the $x, y$ plane, sometimes known as "quadrant 1."

The generalized threshold expression of interest (a function $f$ of $n$ arguments $x_1 \ldots x_n$) is $f(x_1, x_2 \ldots x_n)$ where the arguments $x_1, x_2 \ldots x_n$ have respective positive weights $w_1, w_2 \ldots w_n$. The threshold is T, and U is defined as $U = w_1 + w_2 + \ldots + w_n + 1 - T$.

The numbered paragraphs below are the general rules for the construction. These rules are illustrated in FIGURES 15a–15d.

(1) A line is drawn from the origin of quadrant I $(0, 0)$ to $(w_1, 0)$ and legended $x_1$. (Here and elsewhere it is to be understood that the first letter in a group of two letters with parentheses refers to the abscissa and the second letter to the ordinate.) Next a line is drawn from $(0, 0)$ to $(0, w_1)$ and legended $\overline{x}_1$. The points at the ends of these lines are defined as "$x_1$-end points."

(2) In general, for any $i<n$ (where $i$ is the subscript of $w$), having defined a collection of $x_i$ end points by a previous step (such as step 1) the procedure below is followed:

For each $x_i$-end point $(a, b)$ such that $a<T$ and $b<U$, two lines are drawn—one from $(a, b)$ to $(a+w_{i+1}, b)$ which is then legended "$x_{i+1}$," and one from $(a, b)$ to $(a, b+w_{i+1})$ legended "$\overline{x}_{i+1}$." In addition, all of the points $(a+w_{i+1}, b)$ and $(a, b+w_{i+1})$ reached by this process are defined as $x_{i+1}$ end points. When all allowable $(a, b)$ have been so treated, this step (2) is repeated for the next value of $i$ unless $i=n$.

(3) When $i=n$ and the above process has terminated then: first all end points $(a, b)$ which satisfy $a \geq T$ are connected together and legended $f$ and second all end points $(a, b)$ which satisfy $b \geq U$ are connected together and legended $\overline{f}$.

The procedure above may be illustrated by an example $f(x_1, x_2, x_3, x_4) = x_1(x_2+x_3+x_4) + x_2, x_3, x_4$ realizable by a 4-input threshold gate having respective input weights of (2,1,1,1). (Note that this is the 4-universal function.) The threshold T for this gate is $T=3$, and $$U = 2+1+1+1+1-3=3$$

The first step in the geometric construction is shown in FIGURE 15a. A line is drawn from the origin $(0, 0)$ to $x=2, y=0$ and a second line is drawn from the origin to $x=0, y=2$. The first line is legended $x_1$ and the second $\overline{x}_1$.

Step 2 is illustrated in FIGURE 15b. Lines are drawn from the first $x_1$ end point $(0, 2)$ to $(0, 3)$ and $(1, 2)$. Lines are drawn from the second $x_1$ end point $(2, 0)$ to $(2, 1)$ and $(3, 0)$ respectively. The ends of these four lines are the four $x_2$ end points. They are legended as shown.

Step 3 is shown in FIGURE 15c. The first $x_2$ end point $(0, 3)$ does not meet the criterion of paragraph (2) above since $y$ (which is equal to 3) is not less than U (which is also equal to 3). Therefore, nothing is done to the $\overline{x}_2$ segment leading to this end point, for the present Two lines are drawn from the second $x_2$ end point $(1, 2)$ and these are legended $x_3$ and $x_3$, respectively, in FIGURE 15c. Two lines are drawn from the third $x_2$ end point $(2, 1)$ and these are legended $\overline{x}_3$ and $x_3$, respectively.

No lines are drawn from the last $x_2$ end point $(3, 0)$ as it does not meet the criterion of paragraph (2).

The last step is illustrated in FIGURE 15d. Of the three $x_3$ end points, only one, namely $(2, 2)$, meets the requirements of paragraph (2). Two lines are drawn from this end point and legended $x_4$ and $\overline{x}_4$, respectively.

The above ends the construction since $i=n$, that is, all four arguments have been accounted for. The end points at which $a \geq T$ are connected together as indicated by the dashed line, and legended "$f$." The end points at which $b \geq U$ are connected together as indicated by the dashed line, and legended "$\overline{f}$."

The point $(0, 0)$ represents a point in a circuit at some relatively high voltage such as at the positive value of voltage at terminal 201 in FIGURE 16a. Then:

(I) Each line segment legended $x_i$ is realized by a normally open switch element but which is closed in response to the signal $x_i=1$.

(II) Each line segment legended $\overline{x}_i$ may be realized in any one of a number of ways. One of these is listed under paragraph (a) below. Others are given later after a discussion of an implementation of paragraph (a) and of circuits which produce outputs indicative of a function $f$ but not of its complement $\overline{f}$.

(a) By a normally closed switch element which, in response to the signal $x_i$, is opened, that is, when $x_i=1$, the switch opens. Note that in this case the two segments $x_i$ and $\overline{x}_i$ emanating from a single point $(a, b)$ may be realized by a single-pole, double-throw switch or its equivalent as, for example, are shown in FIGURES 1–3. With this realization, if the points connected by the segment legended $f$ are connected electrically, they are at a high potential when $f(x_1 \ldots x_n)=1$. Otherwise, they are disconnected from the source of high potential and represent a 0. Similarly, if the points connected by the segment legended $\overline{f}$ are electrically connected, they are at a high potential when $f(x_1 \ldots x_n)=0$. Otherwise, they are disconnected from the high potential source and represent a 0. These rules are now applied to obtain FIGURE 16a. The elementary elements simulate single-pole, double-throw switches, as specified in paragraphs I and II. Note that for convenience each block is labelled by the variable which controls its state. The segments $x_1$ and $\overline{x}_1$ are realized by elementary element 202. Segment $\overline{x}_1$ corresponds to the normally closed portion of the "switch" 202 and it connects to element 204. The normally open switch portion of element 202 connects to element 206.

There are two segments extending from $x_2$ end point 208 in FIGURE 15d. The $\overline{x}_3$ segment is directly connected to segment $f$ in FIGURE 15d and this is simulated in the circuit of FIGURE 16a by a direct connection of lead 210 to output terminal 212. The segment $x_3$ between end points 208 and 200 in FIGURE 15d corresponds to the normally open switch in element 214 of FIGURE 16a. The element 216 in FIGURE 16a corresponds to the segments $\overline{x}_3$ and $x_3$ extending from end point 218 in FIGURE 15d. The segment $x_3$ corresponds to the normally open switch and, since in the FIGURE 15d this segment is directly connected to $f$, in FIGURE 16a lead 220 is directly connected to the output terminal 222. The last element 224 in FIGURE 16a corresponds to the two switches, one normally open, the other normally closed originating at point 200 in FIGURE 15d.

FIGURE 16a is the same circuit as is shown in FIGURE 5a, but with different letters representing the arguments. Its operation may be illustrated by the specific example $x_1=0$ and $x_2, x_3$ and $x_4$ all equal to 1. Since $x_1=0$, a positive voltage appears at lead 226. As $x_2=1$, a positive voltage appears at lead 228. As $x_3=1$, a positive voltage appears at lead 230. As $x_4=1$, a positive voltage appears at lead 232 and, as this voltage is applied to the output terminal 222, $f=1$. This is the correct answer.

In the circuits of the invention dealt with up to this point, each building block produces an output indicative of some threshold function and also the complement of this output. Within each element of the building block there is means for simulating a single-pole, double-throw switch. In the case of the electromechanical embodiment, the means comprises switch contacts and in the case of an electronic embodiment, the means may comprise a pair of transistors or other switch elements. It is possible to simplify the circuits if the complementary output either is not needed or is obtained in some other way as, for example, by applying the uncomplemented output to a logical inverter. In these cases, the elementary elements may be such as shown in FIGURES 8 or 9. The element, in both cases, simulates the operation of a single-pole, single-throw switch, that is, a switch which in one condition represents an open circuit and in another condition a closed circuit.

The element of FIGURE 8 includes a switch arm 112, a terminal 114 and a relay coil 116. When $x$ represents a 0, the relay is disabled and the switch arm is biased to the position shown. In this condition, $u$ is disconnected from $v$. When $x$ represents a 1, the relay is activated, arm 112 makes contact with terminal 114 and, if a positive voltage is present at $u$, it is also present at terminal $v$.

The elementary element of FIGURE 9 may include a P-type MOS transistor 117 of the enhancement type and an inverter 119. When $u$ is at a positive value such as $+V$ and $x$ represents a 0 (ground) the inverter 119 applies a 1 ($+V$) to the gate 118, and the source 120 and gate 18 are both approximately the same potential. Under this set of conditions, the source-to-drain path of the transistor presents a high impedance. When $u$ is at a positive value such as $+V$ and $x$ represents a 1 (also at $+V$), the inverter 118 applies a 0 to the gate 118 and the source-to-drain path of the transistor represents a low impedance.

The inverter is employed in FIGURE 9 to enable the same conventions to be used throughout the figures. In practice, a single transistor is all that is necessary for the element of FIGURE 9. For example, if $-V$ represents a 1 and is the value also of $u$, an N-type transistor may be employed for transistor 17 and no inverter is needed.

In FIGURES 10 and 11, the circuits of FIGURES 8 and 9 are represented as a small box with an $f$ inside the box. In the remaining figures not yet discussed, for the sake of convenience, the circuit element of FIGURES 8 or 9 is represented as a block with a capital letter within the block which represents the signal applied to the block.

FIGURE 10 is a block circuit diagram of an embodiment of the invention which operates as a 5-universal gate but which uses the elements of FIGURES 8 or 9. The gate includes 11 elementary elements and 4 conventional positive resistance diodes. The function of the positive resistance diodes is to prevent undesired feedback of current from the output of one elementary element to the input of another elementary element. Note that the network of FIGURE 10 is the same as that of FIGURE 7, except that the normally closed contacts have been replaced either by direct connections or by diodes.

The operation of the circuit of FIGURE 10 may be understood by assuming a given set of input conditions. For example, assume that B, C, E and F are all 1 and that D and A are both 0. The bit $B=1$ applied to element 122 produces an output at lead 124. This output serves as an input to elements 126, 128 and 130. The bit $C=1$ applied to element 126 results in an output at lead 132. This output serves as an input to elements 134, 136 and 138. The bit $E=1$ causes element 138 to produce an output at lead 140. The bit $F=1$ causes element 142 to produce an output at output terminal 144. Thus, when B, C, E and $F=1$, $U_5=1$ and this checks with Boolean Equation 2.

Suppose instead of the conditions above that B, C and $E=1$ and D, A and $F=0$. The operation through the network to the output of element 138 is the same as above. However, if $F=0$, element 142 produces no output. Therefore, $U_5=0$ (note that terminal 144 is connected to ground through a load (not shown)) and this also checks with Boolean Equation 2.

In the circuit above, if the diodes were not present, the circuit operation would be impaired. For example, an output from element 128 would be fed back to the element 134 and this element would now produce an output $U_5=1$ regardless of the value of bits A, E and F.

An alternate form of the circuit of FIGURE 10 is shown in FIGURE 11. In this circuit there are two elementary elements actuated by the bit F rather than the one element of FIGURE 10. However, only three diodes are employed rather than the four of the circuit of FIGURE 10. Tradeoffs of this type are possible in the circuits of the invention, that is, in many cases elementary elements can be substituted for diodes, if desired. The choice of which element or elements to employ in a particular design will depend upon factors such as cost, ease of design and so on.

Figure 23:
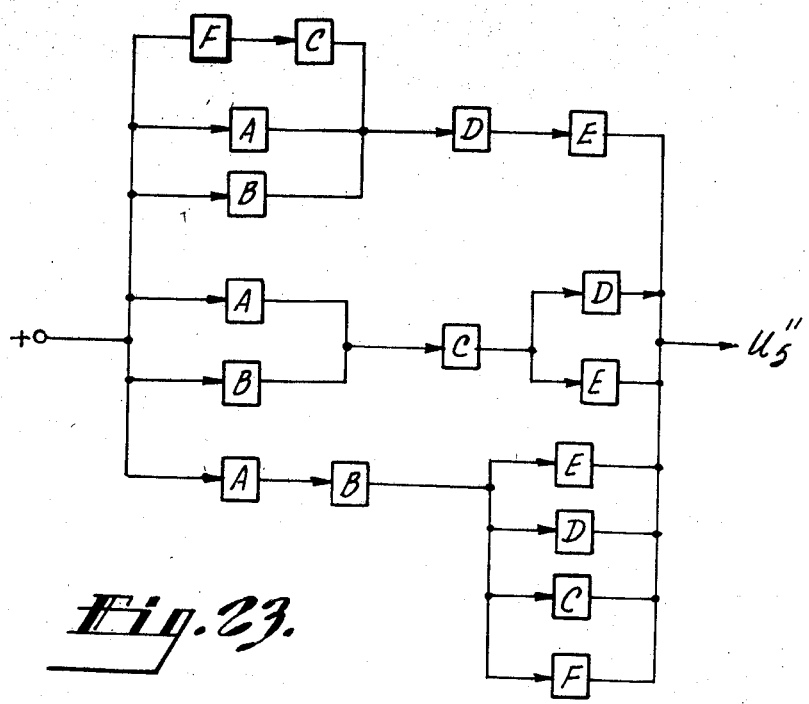
FIGURE 23 is a diagram of a modified form of the circuit of FIGURE 13.

FIGURES 12, 13 and 23 are other circuits according to the invention for implementing 5-universal threshold functions. In the circuits of FIGURE 12 sub-networks of elementary elements are substituted for diodes. The circuit of FIGURE 13 also employs only elementary elements. It realizes the 5-universal function $$U_5''(A,B,C,D,E,F) = AB(C+D+E+F) + (A+B)(CD+CE+DE) + CDEF$$

which can also be realized by a threshold gate with weights 3,3,2,2,2,1, and threshold 7.

FIGURE 14 is an embodiment of the invention for implementing the 6-universal threshold function. It employs only 34 elementary elements which is remarkably small for a function of this complexity.

To trace the operation of the circuit of FIGURE 14, assume that A, B and F are 1 and that all the remaining bits are 0. It should be recalled that these three bits are assigned a total weight of 10 and that the network should produce a 1 since 10 is equal to the threshold. The bit $A=1$ actuates elements 150, 152, 154 and 156. The bit $B=1$ actuates elements 158, 160, 162 and 164. The bit $F=1$ actuates elements 172, 174, 176, 177 and 178. The activated elements 150, 158, 154 and 176 form a low impedance path between the input terminal 178 and the output terminal 180. Here, as in the other circuits, terminal 178 may be at some positive voltage and terminal 180 may be connected through a load (not shown) to ground. Accordingly, terminal 180 assumes a positive value, indicative of a 1 and $U_6=1$, as required.

The general rules of construction for designing a network in which no complementary output is desired include those already given through paragraph II and, in addition, include the ones listed below.

II(b) If the end point of a segment legended $\bar{x}_i$ is not also the end point of the segment legended $x_i$, then the segment $\bar{x}_i$ can be realized simply by an electrical connection—a wire. An example in FIGURE 15d is the segment $\bar{x}_i$, the end point of which is not the end point of any other segment $x_i$. If segment $\bar{x}_i$ is realized by a simple electrical connection then the segment legended $\bar{f}$ in the network cannot be used as an output since $\bar{f}$ will always be connected to the source of high potential. For example, in FIGURE 16a, if this is done for elements 202 and 204, then terminal 201 will connect permanently to line 226 and the latter to line 210.

(c) If the end point $(a, b+w_i)$ of a segment $\bar{x}_i$ is also the end point $(c+w_i, d)$ of a segment $x_i$, then any one of three realizations of $\bar{x}_i$ may be employed. (Note that $(a, b)$ and $(c, d)$ are thus the "southern" and "western" neighbors of the end point in question.)

(i) The segment $\bar{x}_i$ may be realized by a normally closed contact as in II(a) above. In FIGURE 15d, point 200 is an end point which is common to $\bar{x}_3$ and $x_3$. The segment $\bar{x}_3$ in this case can be realized by a normally closed contact; the combination of normally open and normally closed contacts constitutes an $e$-element as described above. If rule II(b) above is applied to the five $x_1$ segments of FIGURE 15$d$ to which it is applicable, and the present rule to the remaining segment, FIGURE 16$b$ results.

(ii) The segment $\bar{x}_i$ may instead be realized by a diode which conducts in the direction of increasing $y$. FIGURE 10 was designed following this procedure, with rule (b) above used whereever possible.

(iii) The segment $\bar{x}_i$ may be realized by a subnetwork of normally open contacts designed according to the following rules. Let R be the Boolean expression (not using any complementation) which is arrived at in the following way:

For each path from (0, 0) to (c, d), the "western" neighbor, accomplished by incremental increases in $x$ and $y$ coordinates, the logical products of the segments legended $\bar{x}_i$ which are traversed are recorded. P is a sum of these products. For each path from (0, 0) to (a, b), the "southern" neighbor, accomplished by increases in the $x$ and $y$ coordinates, the logical products of those segments legended $x_i$ appearing on segments traversed are recorded. Q is the sum of these products. The product $R=\overline{P}Q$ may now be calculated. It is a frontal function (that is, no complements are needed) and any network realizing $\overline{P}Q$ can be used to implement the segment $\bar{x}_i$ from (a, b) to (a, b+$w_i$).

A specific example of what is discussed in paragraph (iii) above is shown in FIGURE 17. This figure is the geometric construction employed to realize the $U_5$ network of FIGURE 12. Let the common end point, an end point of $x_3$ and $\bar{x}_3$, be (a, b+$w_1$)=(c+$w_1$, d)=(2, 4). In this case, $a=2$, $b=2$, $w_1=2$, $c=0$ and $d=4$. There is only one path from (0, 0) to (c, d) that is, to (0, 4), and the $\bar{x}_i$ segments traversed are $\bar{x}_1$ and $\bar{x}_2$, so that $P=\bar{x}_1\bar{x}_2$. The $\bar{x}_i$ segments traversed in going from (0, 0) to (a, b), that is, to (2,2) are $x_1$ or $x_2$ (note here that there are two alternate paths which are possible) so that $Q=x_1+x_2$. Therefore, $\overline{PQ}=\overline{\bar{x}_1\bar{x}_2}$ $(\bar{x}_1+\bar{x}_2)=x_1+x_2$. This function may be realized by two single-pole, single-throw switches connected in parallel, one closed in response to the signal $x_1$ and the other closed in response to the signal $x_2$. A realization of this type appears in FIGURE 12.

Rule (b) has been used to replace all $\bar{x}_i$ segments by wires except four—except those ending at (2, 2), (2, 4), (4, 2) and (5, 5). These segments are realized by (i) the middle "B" in the second column, (ii) the B–C pair in parallel near the top of the third column, (iii) the B–C pair in series near the bottom of the third column, and (iv) the A in the middle of the next-to-last column, respectively.

Minor circuit modifications are possible and sometimes useful. Five examples, not intended to be exhaustive, follow:

(1) The role of "+" and the output can be interchanged.

(2) Any series configuration arbitrarily can be reordered.

(3) To avoid the solution in paragraphs (i), (ii) and (iii) above, electrical connections between circuit points normally identified in the above construction can be avoided. Although a basic idea of the construction is to arrange the elements in such manner that pairs of points in the circuit represent the same partial inputs sums, so that each such pair can be connected together and in this way, made to share some subsequent portion of the circuit, it sometimes occurs that the measures required to prevent the feedback of current when there are such common connections, are more expensive than the duplication would be of the otherwise shared circuits. In these cases, the two end points representing the same partial sum may be considered separately in the construction and whatever additional segments are needed thereafter duplicated. This type of modification is illustrated in FIG-URE 11, in which two gates corresponding to gate 142 of FIGURE 10 are employed in order to save one diode.

Figure 20:
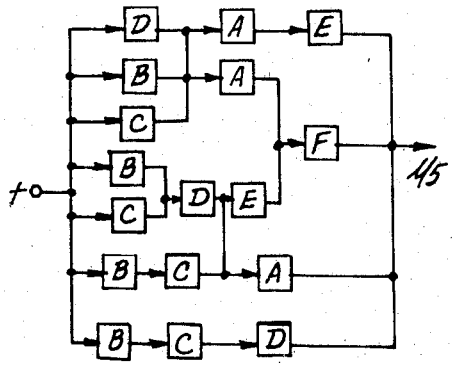
FIGURE 20 is a modified form of circuit for realizing a 5-universal threshold function.

(4) A configuration such as shown in FIGURE 18$a$ can be converted to the configuration shown in FIGURE 18$b$ with no change in network performance. A change of this type tends to reduce the number of switches through which the high potential propagates. As an example, the network of FIGURE 12 can be transformed into that of FIGURE 20, as follows: (a) Point 2000 is moved to +. (b) 2001 is moved to +. (c) Point 2002 is moved to +. (d) The position of gate 2003 is interchanged with that of gate 2004. (They are in series, so this is permissible.) (e) Point 2005 is moved to point 2006. (f) The position of gate 2003 is interchanged with that of gate 2004 again. (g) Point 2005 is moved to +. (h) Point 2007 is moved to 2008. The result of these changes is a decrease in the maximum number of elements in any path from six to four.

Figure 21:
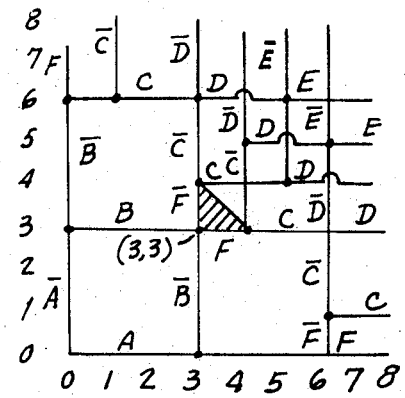
FIGURES 21 and 22 are other examples of graphical constructions.

(5) Suppose segments $x_i$, $\bar{x}_i$ are so placed in the geometric construction that they have no effect on the output of the corresponding network. Such segments are characterized in that identical sub-networks are connected between the respective end points of $x_i$ and $\bar{x}_i$ and the outputs. The middle segments $f$ and $\bar{f}$ in FIGURE 21 are such segments. In such a case, the corresponding end point of the previous $x_{i-1}$ segments, in this case (3, 3), is interpreted to consist of the entire triangle bounded by the segment (shaded in the example), no segments $x_i$ or $\bar{x}_i$ need to provide, and only one pair of subsequent $x_{i+1}$ and $\bar{x}_{i+1}$ segments, in this case C and $\overline{C}$ segments, need be defined. Each such sebsequent segment starts anywhere in the triangle. In the subsequent realization, the starting points must be connected to the original origin of the deleted switch, in this case (3, 3). For example, in FIGURES 22, the $\overline{C}$ segment starts at (3, 4) and the C segment starts at (3, 3). The effect of this modification is to reduce the number of switches needed.

Figure 22:
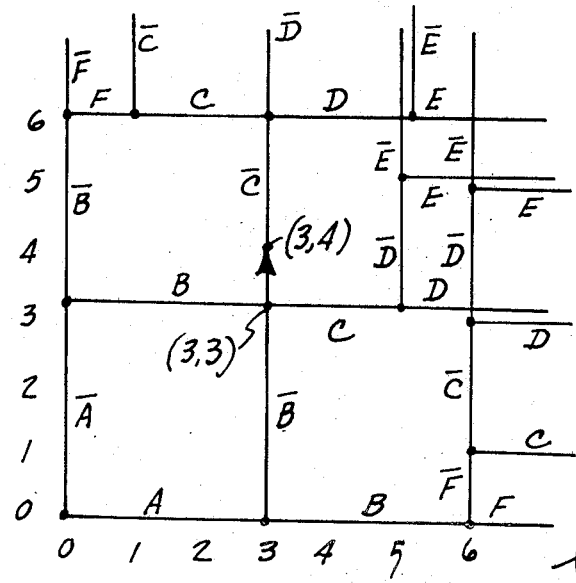

If FIGURE 22 is further modified in accordance with the rules given above, the network of FIGURE 23 results. FIGURE 23 is equivalent to FIGURE 13, except that variables C and E have been interchanged, and some serial arrangements of sub-networks rearranged.

Whichever of the various modifications are made, the following essential characteristics of the networks of this invention are preserved:

(1) A threshold function is realized.

(2) The network contains realizations of normally open contacts.

(3) The network is "unidirectional," that is, a "positive direction" can be assigned between the transmission terminals of each such normally open contact (in FIGURES 1, 2 and 3 this direction is from $u$ to $w$), such that the following is true: Given any set of values for the network input variables which give an output of 1, there exists a path through the network, from + to output, traversing elementary blocks corresponding to these variables in this predefined positive direction. Thus, in the present circuits no element in a conducting path between the input and output terminals of the network is required to conduct in one direction in response to one combination of input variables which cause a 1 output from the network and in the other direction in response to a different combination of input variable which cause a 1 output from the network.

(4) For each input combination such that the network output is 1, a conducting path exists from the potential source through the network to the output. There is a sequence of variables which control the successive elements encountered in this path. This sequence may be simplified by removing repetitions of each variable after its first ocurrence. (In the case of $e$-elements, any barred variable (such as A) is ignored.) Each such simplified sequence of variables obtained is "compatible with" (either as it stands or with minor, logically trivial, circuit modification) a predetermined sequence of all of the variables of the function realized by the network. For example, C, A, B, D is compatible with C, E, F, A, B, G, D since the variables C, A, B, D occur in the same order in C, A, A, B, D, as in C, E, F, A, B, G, D.

(5) There exist at least two paths as described above, for different input combinations of variables, from the input terminal to the output terminal which join at a common point within the network. The path from the common point to the output terminal is identical for both of these paths and includes at least one elementary element.

As an example of these concepts, FIGURE 12 is unidirectional, taking the directions of each element as left to right, that is, from "input" to "output," and is compatible with the input sequence B, C, D, A, E, F. This may be illustrated by listing the sequences of variables corresponding to the successive elements encountered in several different conducting paths which produce $U_5=1$ outputs.

| A | B | C | D | E | F | Path |
|---|---|---|---|---|---|------|
| 1 | 1 | 0 | 0 | 0 | 1 | B, B, B, A, A, F |
| 1 | 0 | 1 | 1 | 0 | 0 | C, D, A |
| 0 | 1 | 1 | 1 | 0 | 0 | B, C, D |
| 0 | 0 | 1 | 1 | 1 | 1 | C, D, E, F |

Note that in the first row of the table, omission of repeated variables results in the sequence B, A, F, which is indeed compatible with the preassigned ordering B, C, D, A, E, F.

It is clear, for any network constructed by rules given above, how directions and ordering should be assigned—always left to right—and that the above properties are satisfied. However, when the network is given, and the ordering is not known in advance, it may not be evident at first glance whether or not the properties discussed are present. Following is a discussion of how such a determination may be made.

Consider the network of FIGURE 13. The first step is to determine the proper ordering, taking into account any serial rearrangements that may exist. Because of the occurrence of a serial pair C, D, these two variables must occur together in the ordering. Similarly, with A, B, and with E, F. Thus, the possible orderings are (ignoring the order between the two variables in each of the above pairs, which is arbitrary)

Figure 24:
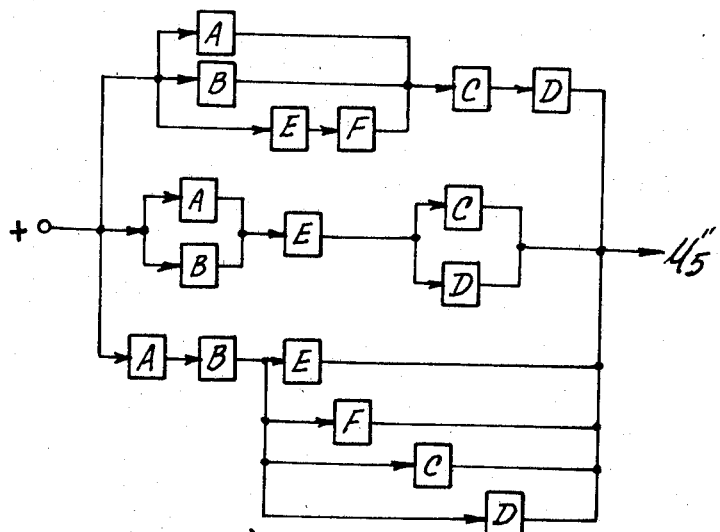
FIGURE 24 is a diagram of a logically trivial rearrangement of the circuit of FIGURE 13 to show the "compatibility" property of this circuit.

(a) A,B, C,D, E,F
(b) A,B, E,F, C,D
(c) E,F, A,B, C,D or any of these in the reverse order. However, (a) is impossible because any serial rearrangement of the sub-network described by the Boolean expression $CD(A+B+EF)$ of FIGURE 13 is not compatible with (a). (c) is similarly impossible because of the sub-network described by $AB(C+D+E+F)$. Thus (b), or the reverse, is the only ordering that could possibly work. If the network is rearranged according to (b), FIGURE 24 is obtained and the property of compatibility is clearly satisfied.

What is claimed is:

1. A circuit for realizing a threshold function $f$ of $n$ arguments $x_1, x_2 \ldots x_n$ comprising:

a network of two-condition elements connected between a network input terminal and at least one network output terminal, each such element having solely a single information signal input first terminal, and at least second and third terminals wherein each element includes switch means having a common input terminal corresponding to said second terminal, one output terminal corresponding to said third terminal, and another output terminal constituting a fourth terminal, and means for causing said switch means to exhibit a high impedance between its second and third terminals and a low impedance between its second and fourth terminals in response to an information signal representing one binary value of an argument, and for causing said switch means to exhibit a low impedance between its second and third terminals and a high impedance between its second and fourth terminals in response to an information signal representing the other binary value of an argument; and in which each connection in said network from the second terminal of one element through that element to the third terminal of another element is via the fourth terminal of said one element, at least one connection in said network from the second terminal of one element through that element to the third terminal of another element, at least one element being connected at its second terminal to said network input terminal, a plurality of said elements being connected at their third terminal directly to said network output terminal, and each said element not connected at its third terminal directly to said network output terminal being connected at its third terminal to the second terminal of another element;

means for applying to the first terminal of each element an informational signal representing solely a single argument for causing a relatively high impedance to be present between the second and third terminals of an element when the information signal applied to said element represents one binary value of its argument and for causing a relatively low impedance to be present between the second and third terminals of said element when the signal applied to said element represents the other binary value of its argument;

a source connected across said network input and output terminals for causing a flow of current between said input terminal and said output terminal when a continuous, low impedance path exists therebetween through elements which exhibit a low impedance between their second and third terminals; and means responsive to current flow through such a low impedance path through said network, for producing an output indicative of the binary value of $f$.

2. A circuit as set forth in claim 1, wherein each element comprises a pair of transistors, the source-to-drain paths of which are connected at one end to receive the same signal, said connection serving as said common input terminal, and the other end of each path serving as said third and fourth terminals, respectively.

3. A circuit as set forth in claim 1 wherein each said element simulates a single-pole, double-throw, switch which includes means for controlling said switch to cause it to exhibit a low impedance between either its second and third or second and fourth terminals.

4. A circuit as set forth in claim 1, wherein each element comprises means simulating a normally open, single-pole, single-throw switch and means for closing said switch to present a low impedance between the second and third elements of said element in response to an information signal representing said other binary value of an argument.

5. A circuit as set forth in claim 4, wherein each said connection between the second terminal of one element and the third terminal of another element is through the switch means of said one element to the third terminal of said one element and includes, in series, between said third terminal of said one element and the third terminal of said other element, an asymmetrically conducting element.

6. A circuit as set forth in claim 4, wherein each said connection between the second terminal of one element and the third terminal of another element is through the switch means of said one element to the third terminal of said one element and includes, in the path between said third terminal of said one element and the third terminal of said other element, information signal controlled switch means.

7. A circuit as set forth in claim 1, further including a second network output terminal, and wherein each element not connected at its fourth terminal to said second network output terminal is connected at its fourth terminal to the second terminal of another element; and further including means responsive to current flow from said network input terminal to said second network output terminal for producing an output indicative of the binary value of $\bar{f}$.

8. In combination:

means providing information signals indicative of N-arguments, where N is an integer;

a network of two condition elements connected between a network input terminal and two network signal output terminals, each such element having solely a single information signal input first terminal; a second terminal and paths between said second terminal and third and fourth output terminals, respectively, a plurality of said elements being connected at their third terminal to one network signal output terminal and a plurality of said elements being connected at their fourth terminal to the other network signal output terminal;

means for applying to the first terminal of each element an information signal representing solely a single argument for causing the path between the second and third terminals of an element to assume a relatively high impedance and the path between the second and fourth elements to assume a relatively low impedance when the information signal applied to said element represents one binary value of its argument and for causing the reverse conditions to exist when the signal applied to said element represents the other binary value of its argument;

a source connected across the input and signal output terminals of said network for causing a flow of current from an input to an output terminal when a continuous, low impedance path exists therebetween through elements; and means responsive to current flow through such a low impedance path through said network, for producing an output indicative of an asymmetric threshold function of N arguments.

9. The combination set forth in claim 8, wherein the last-named means comprises means for producing an output indicative of an N-universal threshold function.

10. In combination:

a network of two condition elements, each including first and second switch means defining two different paths through an element;

means for applying control signals indicative of arguments of a threshold function to the respective elements, solely one argument corresponding to each element, for closing the first switch means and opening the second switch means of an element in response to one value of an argument and for opening the first switch means and closing the second switch means of said element in response to the other value of said argument;

a plurality of parallel paths through said network, each including at least one of the switch means of one said element;

a network signal output terminal to which a plurality of paths through said network converge; and means for producing a signal at said output terminal indicative of the value of said threshold function, said means including means for applying a current to the paths through said network.

11. The combination set forth in claim 10, wherein the first-named means comprises means for applying signals indicative of the N-arguments of N-universal threshold function to the respective elements, where N is an integer greater than 3.

12. The combination set forth in claim 10, wherein the first-named means comprises means for applying signals indicative of the arguments of a majority function to the respective elements.

References Cited

UNITED STATES PATENTS

| 3,252,011 | 5/1966 | Zuk | 307—205 |
| 3,355,598 | 11/1967 | Tuska | 307—304 |

DONALD D. FORRER, Primary Examiner

U.S. Cl. X.R.

307—211, 241, 251, 304; 317—137; 328—92, 103, 152